US008272794B2

(12) United States Patent
Silchenstedt et al.

(10) Patent No.: US 8,272,794 B2
(45) Date of Patent: Sep. 25, 2012

(54) MATERIAL MARKING SYSTEM AND METHOD INCORPORATING AN HMI DEVICE

(76) Inventors: Ed Silchenstedt, Corpus Christi, TX (US); William A Nicholas, Walled Lake, MI (US)

( * ) Notice: Subject to any disclaimer, the term of this patent is extended or adjusted under 35 U.S.C. 154(b) by 546 days.

(21) Appl. No.: 12/432,200

(22) Filed: Apr. 29, 2009

(65) Prior Publication Data

US 2010/0275794 A1    Nov. 4, 2010

(51) Int. Cl.
*B41J 1/54*       (2006.01)
*B23Q 11/00*      (2006.01)
*B23C 3/00*       (2006.01)
*B23C 1/18*       (2006.01)
*G06F 19/00*      (2011.01)

(52) U.S. Cl. ............ 400/127; 409/79; 409/80; 409/131; 409/132; 409/202; 219/121.6; 219/121.61; 700/115; 700/159; 700/182; 700/185

(58) Field of Classification Search .................. 400/127; 409/79–80, 131–132; 700/159–195, 115; 219/121.6

See application file for complete search history.

(56) References Cited

U.S. PATENT DOCUMENTS

| 3,112,688 | A |   | 12/1963 | Pannier |
| 3,895,358 | A |   | 7/1975 | Pearl |
| 4,514,246 | A |   | 4/1985 | Forrer |
| 5,230,765 | A |   | 7/1993 | Weiselfish |
| 5,465,215 | A | * | 11/1995 | Strickland et al. ............ 700/180 |
| 5,775,215 | A |   | 7/1998 | Hirate |
| 5,825,652 | A |   | 10/1998 | LeBlond |
| 6,298,275 | B1 |  | 10/2001 | Herman, Jr. |
| 6,580,963 | B2 |  | 6/2003 | Susnjara |
| 6,655,436 | B1 |  | 12/2003 | Venditti |
| 2002/0108939 | A1 | * | 8/2002 | Mayer ...................... 219/121.79 |
| 2005/0205530 | A1 | * | 9/2005 | Picard et al. ............... 219/121.6 |

* cited by examiner

*Primary Examiner* — Michael G Lee
*Assistant Examiner* — Laura Gudorf

(57) ABSTRACT

A system that allows a material to be marked while still on the CNC tooling table and allows an operator to input marking information just prior to, or even during, the tooling cycle. The present invention comprises a sequence controller associated with a computer readable medium and adapted for communication with the CNC controller. An HMI device and a marker controller are also connected with the sequence controller. A lifter assembly is connected with the sequence controller to raise and lower a marker assembly. The lifter assembly is connected to the gantry of the CNC tooling system with an adaptor block. The present invention provides the advantage of reduced time when compared to marking the part at a separate station remotely located from the CNC system, and allows the operator to input marking information just prior to or during the CNC tooling cycle.

8 Claims, 3 Drawing Sheets

MATERIAL MARKING SYSTEM AND METHOD INCORPORATING AN HMI DEVICE

CROSS-REFERENCES TO RELATED APPLICATIONS

Not applicable.

STATEMENT REGARDING FEDERALLY-SPONSORED RESEARCH OR DEVELOPMENT

Not applicable.

BACKGROUND OF THE INVENTION

1. Field of the Invention

This invention relates to CNC tooling systems. More specifically, the present invention relates to a material marking system that incorporates an HMI device to allow a CNC operator to include additional marking information just prior to starting, or even during, a CNC tooling cycle.

2. Description of the Related Art

Computer numerical controlled (CNC) tooling systems are commonly used to automate manufacturing processes, such as the process of cutting a material into parts for later assembly. Typically, the tool (e.g., a plasma cutter, laser cutter, water jet cutter, band saw, etc.) is attached to a gantry assembly that is moveable in a horizontal plane (i.e., X-Y plane) proximal to the material to be worked. The work material is clamped to a tooling table, after which the CNC tooling system will move the gantry assembly and attached tool along a predetermined tool path necessary to perform the desired work.

In modern CNC tooling systems, end-to-end component design is highly automated using computer-aided drafting (CAD) programs. These programs produce a computer file that is interpreted to generate the commands needed to operate a particular make or model of CNC machine, and then loaded into the CNC machines for production.

For example, the typical CNC tooling process to cut parts from a material (e.g., sheet metal is as follows). First, a CAD draftsman draws the parts to be cut using a CAD program. Second, the CAD drawings are transferred into a nesting program that combines parts from the different part drawing files into a single nested drawing file with the parts arranged to fit on the source material, preferably in such a way so as to minimize waste. Third, the nested drawing file is sent to post-processing software, which converts the drawings into a command file containing specific codes interpretable by the CNC tooling system—also called G-code or preparatory code. Fourth, the command file is sent to the CNC tooling system, which interprets the code and makes the predetermined movements and/or performs the necessary work.

After the material is worked upon (e.g., cut into the desired shape and size), it is customary to mark the material with marking information, such as serial number, the run date, the manufacturer's name, material heat number, and the like. Typically, such marking is performed after the material is removed from the tooling table at a separate station, but moving the material to a different station prior to marking results in an increased likelihood of errors, lost parts, and the possibility of the material not being marked at all. Alternatively, some systems use the cutting tool of a CNC machine (e.g., a plasma torch) to mark parts during the CNC process. In such cases, the CAD draftsman includes the marking information in the part drawing file as a line drawing. During the post-processing step, the post-processing software embeds the marking information in the command file. This technique, however, requires the entire gantry cutting system to make very small and intricate moves to follow the tool path necessary to perform the marking. As a result, the marking is very rough, often has uneven marking depth, and can be difficult to read. Moreover, marking with this methodology is very slow, and offers no mechanism for the operator to input or modify marking information at the time of executing the tooling cycle.

U.S. Pat. No. 5,775,215 (issued Jul. 7, 1998) to Hirate, which is incorporated by reference herein, describes a machine tool with a marking apparatus that can mark parts-data on parts. A mount base is attached to the frame of the machine tool. A marking head is mounted on the mount base at a location other than the tooling location, and provides a pneumatic stylus movable within a horizontal plane.

One common problem with such marking systems as Hirate is that the CAD draftsman may not know all the marking information at the time the parts are drawn. For example, the CAD draftsman may not know the material to be used during the CNC tooling cycle, or the date the parts are to be cut, either of which could potentially be marked on the part. Thus, it would be advantageous to have a system and method that allows a CNC system operator to modify marking information at the time of tooling to include information not known at the time the part was drawn by the CAD draftsman.

SUMMARY OF THE INVENTION

The present invention allows a part to be marked while still on the CNC tooling table prior to concluding the tooling process of the material. This provides the advantage of quicker production as compared to first tooling the material and then moving the material to a separate station for later marking as described in Hirate. In addition, the present invention allows marking information not known prior to the CNC tooling cycle to be incorporated at the time of the cycle. Moreover, the marking is more precise and faster than using the cutting tool to mark the material.

According to one aspect of the invention, a sequence controller associated with computer readable medium is connected to a CNC controller. A human-machine interface (HMI) device and a marker controller are connected the sequence controller. A lifter assembly is connected to the sequence controller to raise and lower a marker assembly having a marker. The lifter assembly is attached to a gantry assembly with an adaptor block.

The marker of the marker assembly is mounted to a carriage of the CNC tooling system, thus allowing the marker to be moved with the CNC tool about the work material. In this manner, the material can be marked prior to completion of the tooling process and as part of the normal tooling cycle without operator intervention or moving the material to another station.

According to the preferred embodiment of the method of the present invention, a marking start command and marking information are received from a CNC tooling system running a command. The marking information is parsed to determine whether at least one predetermined variable string is contained therein, and any such predetermined variable string is replaced with a replacement string retrieved from an connected HMI device. The material is thereafter marked and a marking stop status is sent to the CNC system.

DESCRIPTION OF THE INVENTION

Figure 1:
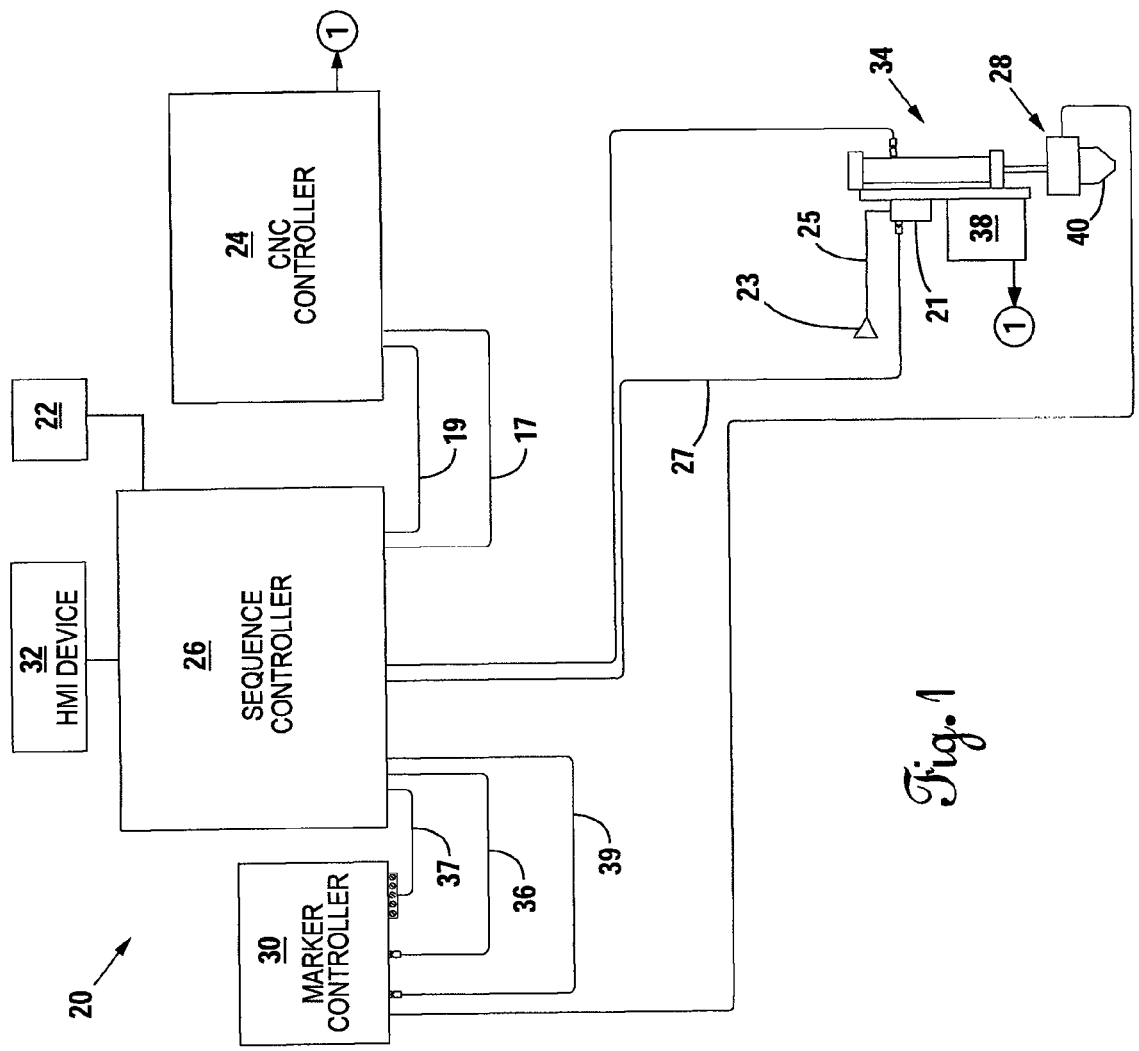
FIG. 1 is a block diagram of the preferred embodiment of the present invention.

FIG. 1 is a block diagram of the preferred embodiment of a material marking system 20 having the features of the present invention. A CNC controller 24 and a gantry assembly 38 having a gantry and carriage is provided. The system 20 operates on a tooling table (not shown) that is stationary, and the material to be worked and/or marked is laid on the tooling table. The gantry assembly 38 is movable in the X-Y horizontal plane over the table as directed by the CNC controller 24: The gantry moves along the X-axis, while the carriage moves along the Y-axis across the frame while holding a tool, such as a cutting torch.

A sequence controller 26 associated with a computer readable medium 22 is adapted for electrical communication with, and connected to, the CNC controller 24 through a serial line 17 and I/O line 19. A marker controller 30 is also in electrical communication with the sequence controller 26 through a serial line 36 and I/O line 37. The marker controller 30 receives power from the sequence controller 26 through a power line 39. In the preferred embodiment, the sequence controller 26 is a programmable logic controller, but in alternative embodiments may be a microcontroller or microprocessor. As used herein, "associated with a computer readable medium" means that either the sequence controller 26 itself includes such a computer readable medium (i.e., on-board RAM memory), or is connected to computer readable medium as is known in the art.

A human-machine interface (HMI) device 32 is connected to the sequence controller 26 to allow the operator of the system 20 to replace predetermined variable strings with replacement strings input by the operator. For example, if the sequence controller 26 detects the predetermined variable string "<date>", the sequence controller 26 will know to retrieve the current date from the HMI device 32. If the sequence controller 26 detects the predetermined variable string "<ser. no.>", the sequence controller 26 will know to retrieve the serial number for the part, which will have been input by the operator into the HMI device 32. In the preferred embodiment, the HMI device 32 is a touchscreen.

In the preferred embodiment, the sequence controller 26 runs a program stored in the computer readable medium 22 operable to selectively reformat information received in a first format readable from the CNC controller 24 into a second format readable by the marker controller 30. Such reformatting is "selective" in that this step is only performed if necessary—that is, if the first format is not the same as the second format. Moreover, such selective reformatting provides significant flexibility and allows the present invention to be used with many different CNC systems, the format of each may be unique to its specific manufacturer. Typically, the first format is a computer line drawing containing the marking information, and the second format is a text string that has been derived by the program from the computer line drawing.

The sequence controller 26 is further in electrical communication with a pneumatic lifter assembly 34 to enable an attached marker assembly 28 having a marker 40 to raise from and lower to the tooling table. The lifter assembly 34 includes electrically-controlled pneumatic valves 21 that are supplied with pressurized air from an air source through an air inlet 23 and air line 25 to control the pressure of the lifter assembly 34. The pneumatic valves 31 are controlled through an I/O line 27 connected to the sequence controller 26. To allow the operator to easily insert the material for tooling and easily remove the material after tooling, the sequence controller 26 signals the lift assembly 34 to raise the marker assembly 28 to a first position that is a safe distance above the tooling machinery and table prior to and at the conclusion of the CNC tooling cycle. To reduce time between marking, however, the sequence controller 26 signals the lift assembly 34 to raise the marker assembly 28 to a second position that is a safe distance above the tooling machinery and table, which is lower than the first position. The lifter assembly 34 of the preferred embodiment comprises a cylinder having a cylinder rod, a brake to hold the cylinder rod from falling when air pressure within the cylinder is reduced, a compressed air filter, a regulator, and a lubricator, and pressure sensors and position sensors to indicate the status of the lifter assembly 34. In alternative embodiments, the lifter assembly 34 is electrical rather than pneumatic.

The lifter assembly 34 and marker assembly 28 are mounted to the gantry assembly 38. The marker assembly 28 is positioned adjacent the tool on the carriage of the gantry assembly 38. It should be noted that the position of the marker 40 will be offset from the CNC tool by a fixed, predetermined distance. As such, it is important that the command file compensate for this offset when moving the gantry assembly 38 to a position for the start of marking.

Figure 2:
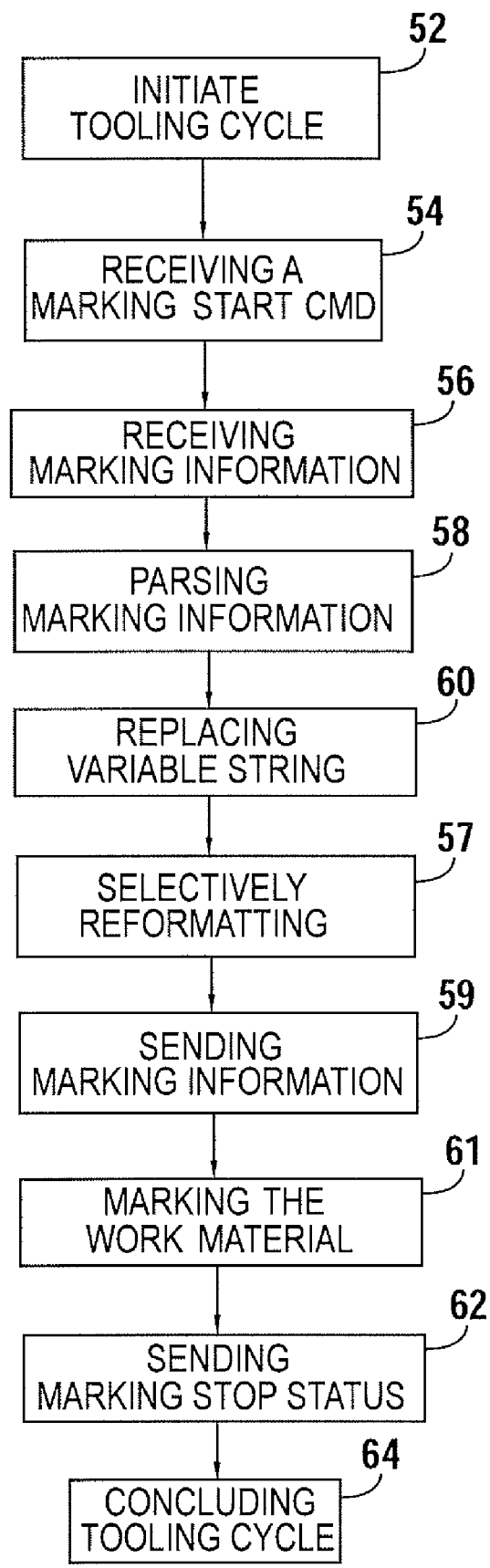
FIG. 2 is a flowchart depicting a method of material marking having the features of the present invention.

FIG. 2 depicts a method of marking material having the features of the present invention. Prior to initiating the tooling cycle, the CAD draftsman draws the part and places the marking information in a location on the part in the drawing. Often, however, the draftsman does not know all of the specific information to be marked (e.g., the exact material to be used, the date of the tooling cycle, etc.). In this case, the CAD draftsman will mark the part with a specific predetermined variable string representative of the information still desired but not then available (e.g., <material> if the material is unknown). In the preferred embodiment, a predetermined variable string is denoted by an opening bracket (<) followed by text followed by a closing bracket (>). The part drawings are thereafter sent to a nesting program, which opens the individual part drawing files, arranges the parts so they will fit on a single sheet of material, and creates a new nested file that includes all the parts that will be cut from the sheet, which parts are rotated and arranged to reduce waste of material.

A post-processing program thereafter processes the nested file into a command file, which is formatted to operate with a particular CNC system. The command file comprises commands that instruct the CNC controller to move the gantry and carriage of the gantry assembly 38 in the X- and Y-axes, as well as actuate and de-actuate the CNC system's tool. As part of this processing step, the post-processing software embeds the marking information in the command file, including any predetermined variable strings included by the CAD draftsman.

At the desired time, a specific CNC tooling cycle is initiated 52, and the CNC controller begins stepping through the command file. When the CNC controller detects a marking command, the CNC controller moves the gantry and carriage of the gantry assembly 38 into the position designated by the command file for marking (compensated for by the necessary offset referenced supra). Thereafter, the CNC controller sends, and the sequence controller receives 54, a marking start command. The CNC controller also sends the marking information previously embedded in the command file by the post-processing software, which marking information is received 56 by the sequence controller.

The sequence controller then parses 58 the marking information to determine the presence of any predetermined variable strings. If such a predetermined variable string is found, the predetermined variable string is replaced 60 with information retrieved from an HMI device. In addition, the sequence controller selectively reformats 57 the marking information received from the CNC controller from a first format (e.g., a line drawing) into a second format (e.g., a text string) readable by the marker controller. Thereafter, the selectively reformatted marking information is sent 59 to the marker controller and the material is then marked 61, after which a marking stop status is sent 62 to the CNC controller to indicate that marking is complete and the tooling cycle can continue. In this manner, sections or parts of material can be marked and these steps repeated as necessary, and the tooling cycle then concluded 64.

Figure 3:
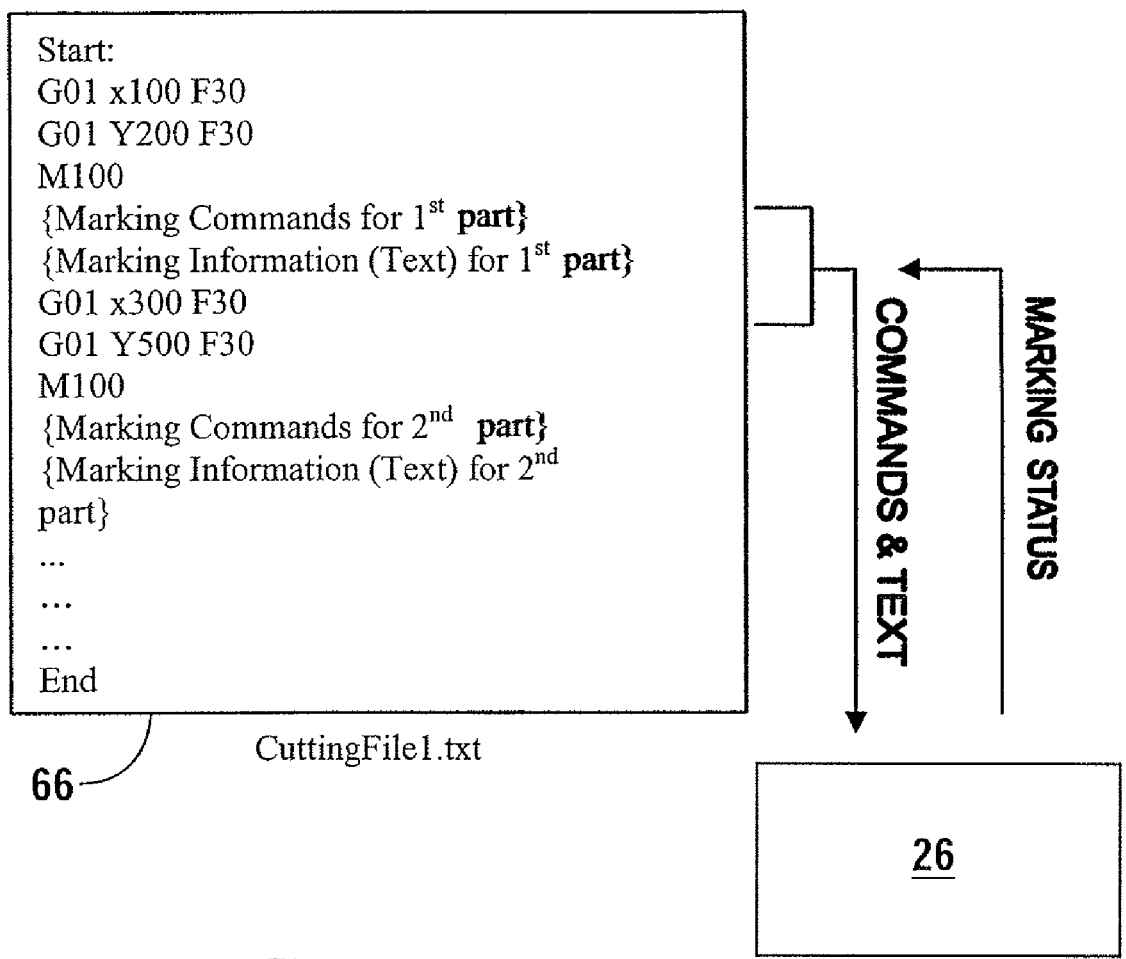
FIG. 3 shows a typical command file that may be used with the present invention to mark material.

FIG. 3 shows content of a typical command file 66 used for a CNC tooling cycle. The file contains G-code and M-code, which dictate operation of the CNC tooling system. For example, the "G" commands move the tool to a position in the X-Y plane and dictate feed rate of material. The "M" commands indicates the start of marking commands and marking information interpretable by the sequence controller 26, and is followed by specifically-formatted marking commands and marking information that are sent to and received by the sequence controller 26. After the sequence controller 26 executes the marking commands and parses the marking information, as described supra, the sequence controller 26 returns marking stop status to the CNC controller, which thereafter resumes executing the command file 66.

The present invention is described in terms of preferred embodiments in which a specific system and method are described. Those skilled in the art will recognize that alternative embodiments of such system, and alternative applications of the method, can be used in carrying out the present invention. Other aspects and advantages of the present invention may be obtained from a study of this disclosure and the drawings, along with the appended claims. Moreover, the recited order of the steps of the method described herein is not meant to limit the order in which those steps may be performed.

We claim:

1. A material marking system for use with a computer numerical controlled (CNC) system having a gantry, a carriage, and a CNC controller, the material marking system comprising:
   a sequence controller connected to the CNC controller, said sequence controller is associated with a computer readable medium;
   a human machine interface (HMI) device connected to said sequence controller;
   a marker controller connected to said sequence controller;
   a lifter assembly connected to said sequence controller;
   a marker assembly mountable to the carriage and having a marker, said marker assembly connected to said lifter assembly and connected to said marker controller; and
   a program embodied in said computer readable medium, said program operable to cause said sequence controller to:
   receive a marking start command from the CNC controller;
   receive marking information in a first format from the CNC controller;
   parse said marking information for at least one predetermined variable string;
   replace at least one of any detected predetermined variable strings in said marking information with at least one replacement string retrieved from said HMI device;
   selectively reformat said marking information into a second format readable by said marker controller; and
   send said selectively reformatted marking information to said marker controller.

2. The material marking system of claim 1 wherein said marker is selected from the group consisting of a plasma arc writer, scriber, laser marker, dot peen marker, plasma torch, chemical etching, an ink marker, and a pin stamp.

3. The material marking system of claim 1 wherein said lifter assembly is adapted to lift said marker assembly to a first position for insertion and removal of cutting material into the CNC system and a second position between markings during a cutting cycle, said second position being lower than said first position.

4. The material marking system of claim 1 wherein said HMI device is a touchscreen.

5. A computer numerical controlled (CNC) system comprising:
   a gantry assembly having a gantry and a carriage movable about a CNC tooling table;
   a CNC controller connected to said gantry assembly;
   a sequence controller connected to said CNC controller, said sequence controller associated with a computer readable medium;
   a human machine interface (HMI) device connected to said sequence controller;
   a marker controller connected to said sequence controller;
   a lifter assembly connected to said sequence controller;
   a marker assembly mountable to said carriage and having a marker, said marker assembly connected to said lifter assembly and connected to said marker controller; and
   a program embodied in said computer readable medium, said program operable to cause said sequence controller to:
   receive a marking start command from said CNC controller;
   receive marking information in a first format from said CNC controller;
   parse said marking information for at least one predetermined variable string;
   replace at least one of any detected predetermined variable strings in said marking information with at least one replacement string retrieved from said HMI device;
   selectively reformat said marking information into a second format readable by said marker controller; and
   send said selectively reformatted marking information to said marker controller.

6. The CNC tooling system of claim 5 wherein said marker is selected from the group consisting of a plasma arc writer, scriber, laser marker, dot peen marker, plasma torch, chemical etching, an ink marker, and a pin stamp.

7. The CNC tooling system of claim 5 wherein said lifter assembly is adapted to lift said marker assembly to a first position for insertion and removal of cutting material into the CNC system and a second position between markings during a cutting cycle, said second position being lower than said first position.

8. The CNC tooling system of claim 5 wherein said HMI device is a touchscreen.

* * * * *